US012625293B2

(12) United States Patent
Chou

(10) Patent No.: US 12,625,293 B2
(45) Date of Patent: May 12, 2026

(54) FREQUENCY-MODULATION TYPE METAL TRACKER

(71) Applicants: MEET ELECTRONICS LTD., Dongguan (CN); Chi Kang Ronald Chou, Dongguan (CN)

(72) Inventor: Chi Kang Ronald Chou, Dongguan (CN)

(73) Assignees: CHI KANG RONALD CHOU, Dongguan (CN); MEET ELECTRONICS LTD., Dongguan (CN)

( * ) Notice: Subject to any disclaimer, the term of this patent is extended or adjusted under 35 U.S.C. 154(b) by 262 days.

(21) Appl. No.: 18/520,961

(22) Filed: Nov. 28, 2023

(65) Prior Publication Data

US 2024/0201412 A1 Jun. 20, 2024

(30) Foreign Application Priority Data

Dec. 15, 2022 (CN) .......................... 202211613331.3

(51) Int. Cl.
| | |
|---|---|
| *G01V 3/10* | (2006.01) |
| *B63B 21/56* | (2006.01) |
| *B63B 35/00* | (2020.01) |
| *G01S 7/04* | (2006.01) |
| *G01S 13/32* | (2006.01) |
| *G01S 13/89* | (2006.01) |
| *G01V 3/165* | (2006.01) |
| *G01V 9/00* | (2006.01) |

(52) U.S. Cl.
CPC ................ *G01V 3/10* (2013.01); *G01V 3/165* (2013.01)

(58) Field of Classification Search
None
See application file for complete search history.

(56) References Cited

U.S. PATENT DOCUMENTS

| | | | | |
|---|---|---|---|---|
| 5,525,907 A | * | 6/1996 | Frazier ..................... | G01V 3/08 |
| | | | | 324/334 |
| 6,636,042 B1 | * | 10/2003 | Dorren ..................... | G01V 3/12 |
| | | | | 324/67 |

(Continued)

*Primary Examiner* — Pablo N Tran
(74) *Attorney, Agent, or Firm* — The Sun IP Law

(57) ABSTRACT

Disclosed is a frequency-modulation type metal tracker, relating to the technical field of detecting instruments. The frequency-modulation type metal tracker includes a metal tracking transmitter which can modulate a wireless frequency-modulation tracking signal and broadcast the wireless frequency-modulation tracking signal to the outside through a metal object, and a metal tracking receiver which can receive the wireless frequency-modulation tracking signal from the metal tracking transmitter, demodulate the wireless frequency-modulation tracking signal, and reproduce information of the wireless frequency-modulation tracking signal. The present disclosure mainly solves the problem of how to provide equipment that can remotely detect and track metal objects. The frequency-modulation type metal tracker can detect and track metal objects such as wires and cables, steel bars, metal water supply and drainage pipes, metal heating and ventilation pipes, and metal racks which are buried in walls, under the ground, and in large objects, to facilitate use by operating personnel.

7 Claims, 2 Drawing Sheets

(56)        References Cited

U.S. PATENT DOCUMENTS

| | | | | |
|---|---|---|---|---|
| 8,237,560 B2 * | 8/2012 | Candy | .................... | G01V 3/104 |
| | | | | 324/329 |
| 2007/0296415 A1 * | 12/2007 | Stamatescu | ............ | G01V 3/104 |
| | | | | 324/228 |
| 2008/0224704 A1 * | 9/2008 | Westersten | ............. | G01V 3/104 |
| | | | | 324/326 |
| 2021/0255357 A1 * | 8/2021 | Fonts | ...................... | G01S 13/88 |
| 2021/0338098 A1 * | 11/2021 | Andreason | ............. | A61B 5/062 |
| 2023/0333244 A1 * | 10/2023 | Fonts | ........................ | G01S 7/04 |

* cited by examiner

FREQUENCY-MODULATION TYPE METAL TRACKER

CROSS-REFERENCE TO RELATED APPLICATIONS

This is a U.S. patent application which claims the priority and benefit of Chinese Patent Application Number 202211613331.3, filed on Dec. 15, 2022, the disclosure of which is incorporated herein by reference in its entirety.

TECHNICAL FIELD

The present disclosure relates to the technical field of detecting instruments, and in particular, to a frequency-modulation type metal tracker.

BACKGROUND

In scenarios such as construction engineering, industrial sites, inspection engineering, fire rescue, and safety hazard investigation, it is often necessary to detect and track metal objects such as wires and cables, steel bars, metal water supply and drainage pipes, metal heating and ventilation pipes, and metal racks which are buried in walls, under the ground, and in large objects, so as to provide reference information for further operations.

However, in some scenarios with harsh environments (such as fires, floods, earthquakes, construction sites, and industrial sites), it is often difficult for operating personnel to directly detect and track the metal objects described above, which makes operations inconvenient.

In summary, how to provide equipment that can remotely detect and track metal objects has become an urgent problem to be solved.

SUMMARY

The present disclosure aims to provide a frequency-modulation type metal tracker, which can remotely detect and track metal objects.

In order to achieve the above objective, the present disclosure provides the following technical solution: A frequency-modulation type metal tracker includes a metal tracking transmitter and a metal tracking receiver; the metal tracking transmitter can modulate a wireless frequency-modulation tracking signal and broadcast the wireless frequency-modulation tracking signal to the outside through a metal object; and the metal tracking receiver can receive the wireless frequency-modulation tracking signal from the metal tracking transmitter, demodulate the wireless frequency-modulation tracking signal, and reproduce information of the wireless frequency-modulation tracking signal.

In the above technical solution, the information of the wireless frequency-modulation tracking signal at least includes existence and intensity of the wireless frequency-modulation tracking signal.

In the above technical solution, the metal tracking transmitter includes a main control U1 and a wireless frequency-modulation signal transmission module, and the wireless frequency-modulation tracking signal transmission module is in signal connection to the main control U1; the metal tracking receiver includes a main control U2, an interaction module, and a wireless frequency-modulation signal receiving module; and the interaction module and the wireless frequency-modulation signal receiving module are both in signal connection to the main control U2.

In the above technical solution, the wireless frequency-modulation signal transmission module includes a signal amplifier submodule, a power regulation submodule, and a first magnetic rod antenna submodule; a signal input end of the signal amplifier submodule is connected to a pin PWM0 and a pin PWM1 of the main control U1, respectively; a signal input end of the power regulation submodule is connected to a pin S0 and a pin S1 of the main control U1; the power regulation submodule, the signal amplifier submodule, and the first magnetic rod antenna submodule are in signal connection to each other in sequence; the wireless frequency-modulation signal receiving module includes a signal demodulation submodule and a second magnetic rod antenna submodule; the second magnetic rod antenna submodule is in signal connection to the signal demodulation submodule; and a signal output end of the signal demodulation submodule is connected to a pin PWM0 and a pin PWM1 of the main control U2.

In the above technical solution, the interaction module of the metal tracking receiver is at least one of a button module, an indicator lamp module, or a buzzer module.

In the above technical solution, the metal tracking receiver further includes an NCV induction module, and the NCV induction module is in signal connection to the main control U2.

In the above technical solution, the NCV induction module includes an induction sheet and a semiconductor device Q2; the induction sheet is connected to a control pole of the semiconductor device Q2; one pole of the semiconductor device Q2 is connected to a universal input/output pin of the main control U2; and the other pole of the semiconductor device Q2 is grounded.

In the above technical solution, the metal tracking transmitter further includes a first Bluetooth module, and the first Bluetooth module is connected to a pin TX and a pin RX of the main control U1, respectively; the metal tracking receiver further includes a second Bluetooth module; and the second Bluetooth module is connected to a pin TX and a pin RX of the main control U2, respectively.

In the above technical solution, the metal tracking transmitter further includes at least one of a button module, an indicator lamp module, or a buzzer module which is in signal connection to the main control U1.

Compared with the prior art, the present disclosure has the beneficial effects below: The metal tracking transmitter broadcasts the wireless frequency-modulation tracking signal to the outside through the metal object, and the metal tracking receives the wireless frequency-modulation tracking signal and reproduces the information of the wireless frequency-modulation tracking signal, so that the frequency-modulation type metal tracker of the present disclosure can detect and track metal objects such as wires and cables, steel bars, metal water supply and drainage pipes, metal heating and ventilation pipes, and metal racks which are buried in walls, under the ground, and in large objects, so as to facilitate use by operating personnel.

DESCRIPTION OF EMBODIMENTS

The technical solutions in the embodiments of present disclosure are clearly and completely described below with reference to the accompanying drawings in the embodiments of present disclosure. Apparently, the described embodiments are merely some rather than all of the embodiments of present disclosure. All other embodiments obtained by a person of ordinary skill in the art based on the embodiments of present disclosure without making creative efforts shall fall within the protection scope of present disclosure.

This embodiment provides a frequency-modulation type metal tracker, which can detect and track metal objects such as wires and cables, steel bars, metal water supply and drainage pipes, metal heating and ventilation pipes, and metal racks which are buried in walls, under the ground, and in large objects.

Figure 1:
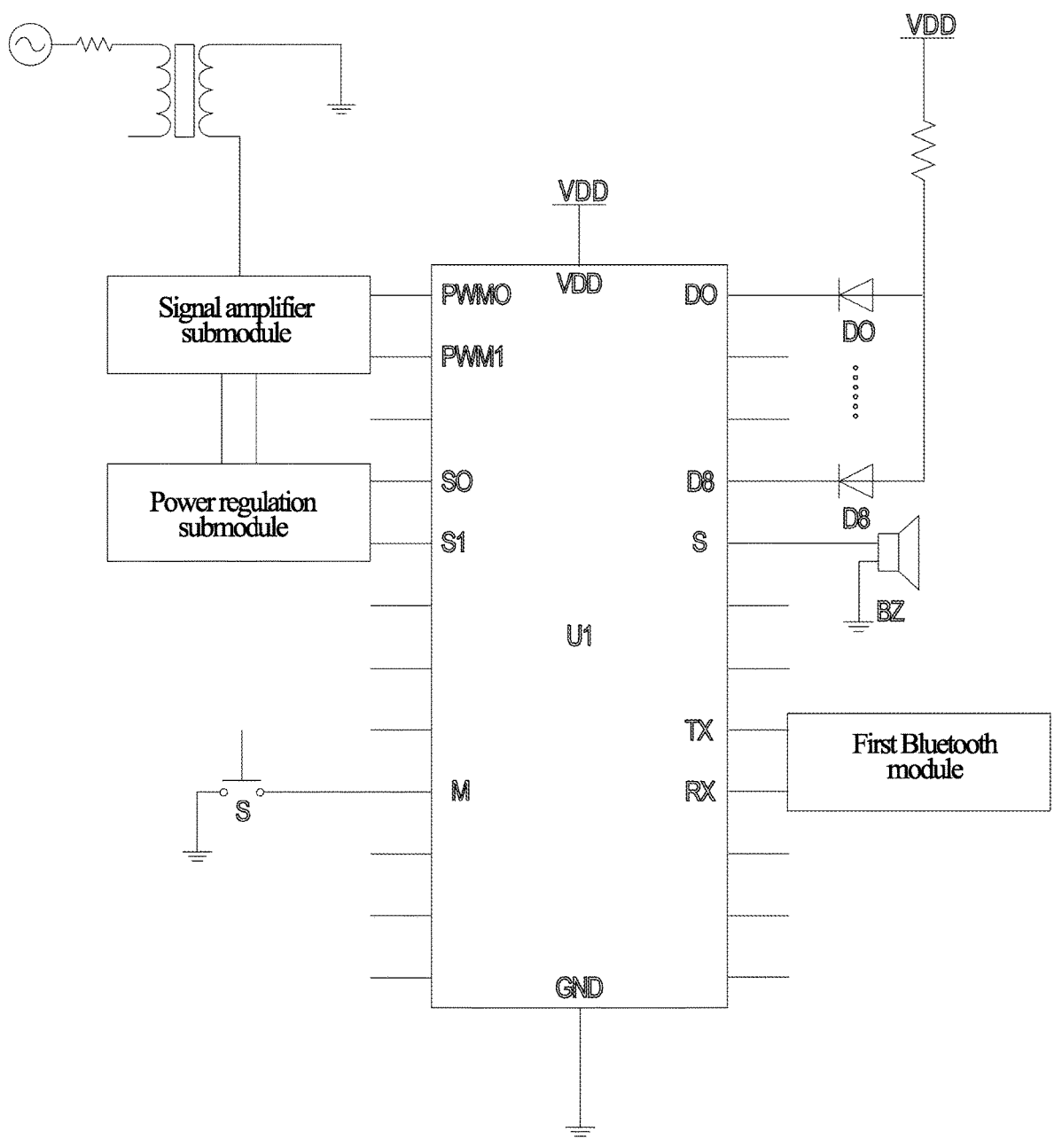
FIG. 1 is a schematic circuit diagram of a metal tracking transmitter in the present disclosure.
Figure 2:
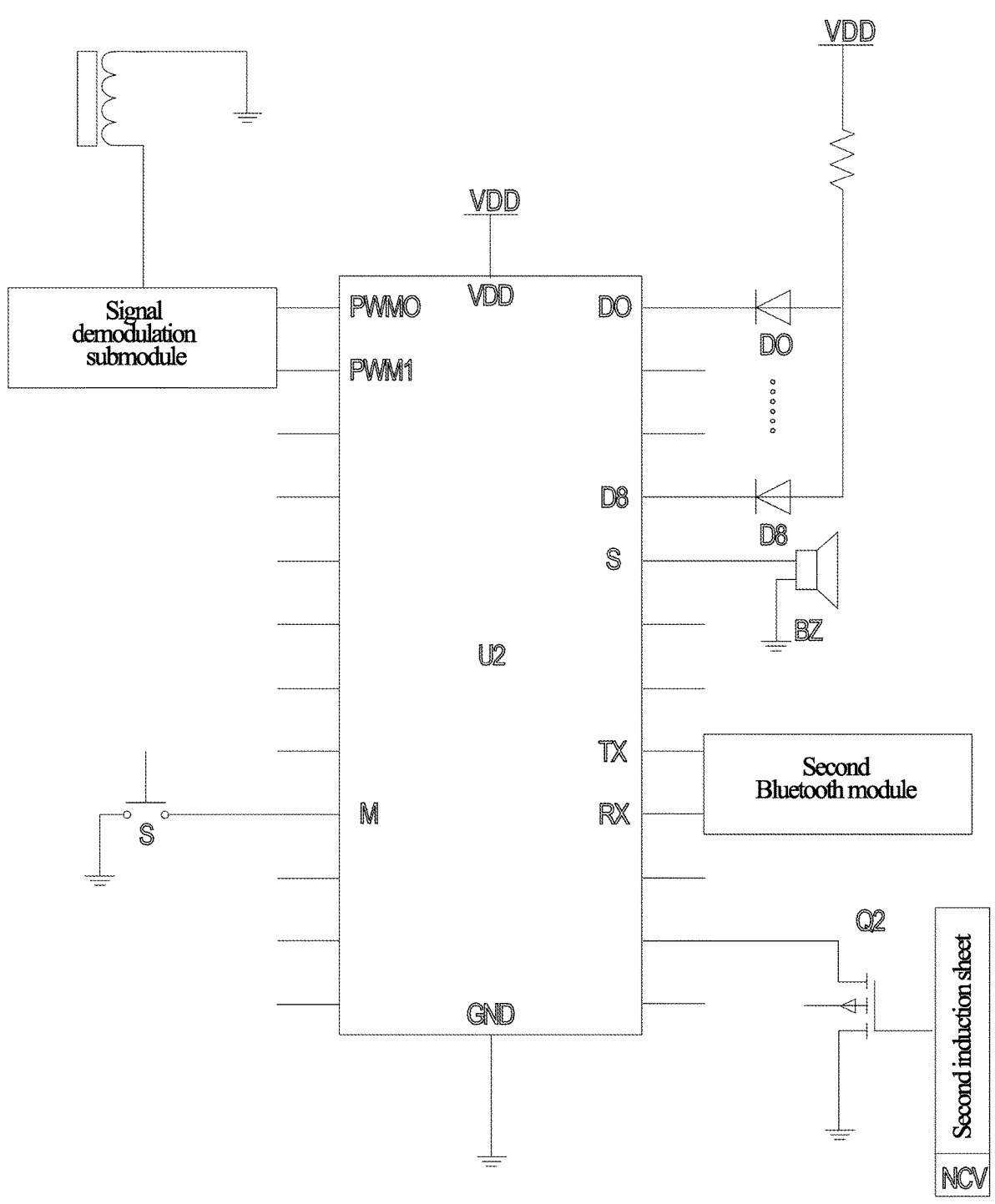
FIG. 2 is a schematic circuit diagram of a metal tracking receiver in the present disclosure.

Referring to FIG. 1 and FIG. 2, the frequency-modulation type metal tracker of this embodiment includes a metal tracking transmitter and a metal tracking receiver. The metal tracking transmitter is integrated in a shell with a printed circuit board (PCB), and the metal tracking receiver is integrated in a shell with another PCB.

The metal tracking transmitter can modulate a wireless frequency-modulation tracking signal and broadcast the wireless frequency-modulation tracking signal to the outside through a metal object; and the metal tracking receiver can receive the wireless frequency-modulation tracking signal from the metal tracking transmitter, demodulate the wireless frequency-modulation tracking signal, and reproduce information of the wireless frequency-modulation tracking signal.

Specifically, the information of the wireless frequency-modulation tracking signal at least includes existence and intensity of the wireless frequency-modulation tracking signal.

Specifically, the metal tracking transmitter includes a main control U1 and a wireless frequency-modulation tracking signal transmission module. The main control U1 is a single-chip microcomputer, a digital signal processing chip (DSP), an embedded chip, and another micro control unit (MCU), which at least has a universal input/output pin, a pin PWM, and a pin TX/RX. The wireless frequency-modulation tracking signal transmission module is in signal connection to the main control U1. The metal tracking receiver includes a main control U2, an interaction module, and a wireless frequency-modulation tracking signal receiving module. The main control U2 is a single-chip microcomputer, a DSP, an embedded chip, and another MCU, which at least has a universal input/output pin, a pin PWM pin, and a pin TX/RX pin. The interaction module and the wireless frequency-modulation tracking signal receiving module are both in signal connection to the main control U2.

Further specifically, the wireless frequency-modulation tracking signal transmission module includes a signal amplifier submodule, a power regulation submodule, and a first magnetic rod antenna submodule; a signal input end of the signal amplifier submodule is connected to a pin PWM0 and a pin PWM1 of the main control U1, respectively; a signal input end of the power regulation submodule is connected to a pin S0 and a pin S1 of the main control U1; and the power regulation submodule, the signal amplifier submodule, and the first magnetic rod antenna submodule are in signal connection to each other in sequence. The first magnetic rod antenna submodule is exposed out of a surface of a shell of the metal tracking transmitter. In this way, the metal tracking transmitter has a wireless frequency-modulation tracking signal transmission function. When the first magnetic rod antenna submodule is mounted on a surface of an exposed metal object, the wireless frequency-modulation tracking signal can be transmitted. The wireless frequency-modulation tracking signal receiving module includes a signal demodulation submodule and a second magnetic rod antenna submodule; the second magnetic rod antenna submodule is in signal connection to the signal demodulation submodule; and a signal output end of the signal demodulation submodule is connected to a pin PWM0 and a pin PWM1 of the main control U2. Furthermore, the second magnetic rod antenna submodule is exposed out of a surface of a shell of the metal tracking receiver. In this way, the metal tracking receiver has a wireless frequency-modulation tracking signal receiving function.

Specifically, the interaction module of the metal tracking receiver is at least one of a button module, an indicator lamp module, or a buzzer module. In this embodiment, the metal tracking receiver is simultaneously provided with the button module, the indicator lamp module, and the buzzer module. The button module is composed of micro switches (S), and all the micro switches are respectively connected to the universal input/output pin of the main control U2. The indicator lamp module is composed of several light-emitting diode (LED) indicator lamps (D1-D8), and all the LED indicator lamps are connected to the universal input/output pin of the main control U2. A buzzer (BZ) in the buzzer module is connected to the universal input/output pin of the main control U2.

Further, the metal tracking receiver further includes an NCV induction module, and the NCV induction module is in signal connection to the main control U2.

Specifically, the NCV induction module includes an induction sheet and a semiconductor device Q2. The induction sheet is a copper sheet, a steel sheet, or another metal sheet, which can generate induced current under a magnetic field or an electric field. The semiconductor device Q2 is a field-effect transistor. The induction sheet is connected to a control pole of the semiconductor device Q2. One pole of the semiconductor device Q2 is connected to the universal input/output pin of the main control U2, and the other pole of the semiconductor device Q2 is grounded. When the induction sheet is placed in the magnetic field or the electric field, the induction sheet can generate induced current under the magnetic field or the electric field, so as to provide a signal for the control pole of the semiconductor device Q2 and then turn on or turn off the two poles of the semiconductor device Q2. The universal input/output pin of the main control U2 obtains the turning on or turning off of the semiconductor device Q2, as well as a turning on frequency or a turning off frequency of the semiconductor device Q2. After conversion, the existence and intensity of an alternating current can be obtained.

Further, the metal tracking transmitter further includes a first Bluetooth module, and the first Bluetooth module is connected to a pin TX and a pin RX of the main control U1, respectively; the metal tracking receiver further includes a second Bluetooth module; and the second Bluetooth module is connected to a pin TX and a pin RX of the main control U2, respectively. By the arrangement of the first Bluetooth module and the second Bluetooth module, the metal tracking transmitter and the metal tracking receiver respectively have a Bluetooth function.

Further, the metal tracking transmitter further includes at least one of a button module, an indicator lamp module, or a buzzer module which is in signal connection to the main control U1. In this embodiment, the metal tracking transmitter is simultaneously provided with the button module, the indicator lamp module, and the buzzer module. The button module is composed of micro switches (S), and all the micro switches are respectively connected to the universal input/output pin of the main control U1. The indicator lamp module is composed of several light-emitting diode (LED) indicator lamps (D1-D8), and all the LED indicator lamps are connected to the universal input/output pin of the main control U1. A buzzer (BZ) in the buzzer module is connected to the universal input/output pin of the main control U1.

According to the frequency-modulation type metal tracker of this embodiment, during use, by way of mounting the first magnetic rod antenna submodule of the metal tracking transmitter on the exposed surface of the metal object, the wireless frequency-modulation tracking signal can be broadcast to the outside through the metal object. The metal tracking receiver is held in a hand, and the second magnetic rod antenna submodule can receive the wireless frequency-modulation tracking signal by way of scanning a wall, the ground, and a surface of a large object. The existence and intensity of the wireless frequency-modulation tracking signal can be indicated through the indicator lamp module or the buzzer module in the interaction module of the metal tracking receiver, thereby indicating existence, a direction, and a burial depth of the metal object.

The metal tracking transmitter broadcasts the wireless frequency-modulation tracking signal to the outside through the metal object, and the metal tracking receives the wireless frequency-modulation tracking signal and reproduces the information of the wireless frequency-modulation tracking signal, so that the frequency-modulation type metal tracker of this embodiment can detect and track metal objects such as wires and cables, steel bars, metal water supply and drainage pipes, metal heating and ventilation pipes, and metal racks which are buried in walls, under the ground, and in large objects, so as to facilitate use by operating personnel.

Although the embodiments of the present disclosure have been shown and described, it can be understood by those of ordinary skill in the art that various changes, modifications, substitutions, and variations can be made to these embodiments without departing from the principle and spirit of the present disclosure. The scope of the present disclosure is defined by the accompanying claims and their equivalents.

What is claimed is:

1. A frequency-modulation type metal tracker, comprising a metal tracking transmitter and a metal tracking receiver, wherein the metal tracking transmitter modulates a wireless frequency-modulation tracking signal and broadcasts the wireless frequency-modulation tracking signal to the outside through a metal object; and the metal tracking receiver receives the wireless frequency-modulation tracking signal from the metal tracking transmitter, demodulates the wireless frequency-modulation tracking signal, and reproduces information of the wireless frequency-modulation tracking signal;

wherein the metal tracking transmitter comprises a main control U1 and a wireless frequency-modulation tracking signal transmission module, and the wireless frequency-modulation tracking signal transmission module is in signal connection to the main control U1;

the metal tracking receiver comprises a main control U2, an interaction module, and a wireless frequency-modulation tracking signal receiving module; and the interaction module and the wireless frequency-modulation tracking signal receiving module are both in signal connection to the main control U2;

wherein the wireless frequency-modulation tracking signal transmission module comprises a signal amplifier submodule, a power regulation submodule, and a first magnetic rod antenna submodule;

a signal input end of the signal amplifier submodule is connected to a pin PWM0 and a pin PWM1 of the main control U1, respectively; a signal input end of the power regulation submodule is connected to a pin S0 and a pin S1 of the main control U1; the power regulation submodule, the signal amplifier submodule, and the first magnetic rod antenna submodule are in signal connection to each other in sequence;

the wireless frequency-modulation tracking signal receiving module comprises a signal demodulation submodule and a second magnetic rod antenna submodule;

the second magnetic rod antenna submodule is in signal connection to the signal demodulation submodule; and a signal output end of the signal demodulation submodule is connected to a pin PWM0 and a pin PWM1 of the main control U2.

2. The frequency-modulation type metal tracker according to claim 1, wherein the information of the wireless frequency-modulation tracking signal at least comprises existence and intensity of the wireless frequency-modulation tracking signal.

3. The frequency-modulation type metal tracker according to claim 1, wherein the interaction module of the metal tracking receiver is at least one of a button module, an indicator lamp module, or a buzzer module.

4. The frequency-modulation type metal tracker according to claim 1, wherein the metal tracking receiver further comprises an NCV induction module, and the NCV induction module is in signal connection to the main control U2.

5. The frequency-modulation type metal tracker according to claim 4, wherein the NCV induction module comprises an induction sheet and a semiconductor device Q2;

the induction sheet is connected to a control pole of the semiconductor device Q2; one pole of the semiconductor device Q2 is connected to a universal input/output pin of the main control U2; and the other pole of the semiconductor device Q2 is grounded.

6. The frequency-modulation type metal tracker according to claim 5, wherein the metal tracking transmitter further comprises a first Bluetooth module, and the first Bluetooth module is connected to a pin TX and a pin RX of the main control U1, respectively;

the metal tracking receiver further comprises a second Bluetooth module; and the second Bluetooth module is connected to a pin TX and a pin RX of the main control U2, respectively.

7. The frequency-modulation type metal tracker according to claim 6, wherein the metal tracking transmitter further comprises at least one of a button module, an indicator lamp module, or a buzzer module which is in signal connection to the main control U1.

* * * * *